United States Patent
Rosen et al.

(10) Patent No.: US 11,182,205 B2
(45) Date of Patent: Nov. 23, 2021

(54) MULTI-PROCESSOR QUEUING MODEL (71) Applicant: Mellanox Technologies, Ltd., Yokneam (IL)

(72) Inventors: Amir Rosen, Haifa (IL); Tsofia Eshel, Eshchar (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 122 days.

(21) Appl. No.: 16/237,755

(22) Filed: Jan. 2, 2019

(65) Prior Publication Data

US 2020/0210230 A1 Jul. 2, 2020

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/505* (2013.01)

(58) Field of Classification Search
CPC .............................. G06F 9/4881; G06F 9/505
See application file for complete search history.

(56) References Cited

U.S. PATENT DOCUMENTS

| | | | | |
|---|---|---|---|---|
| 5,109,512 A * | 4/1992 | Bahr | ..................... | G06F 9/5033 718/103 |
| 5,317,738 A * | 5/1994 | Cochcroft, Jr | ...... | G06F 12/0842 711/118 |
| 5,872,972 A * | 2/1999 | Boland | ................. | G06F 9/5033 718/102 |
| 5,903,757 A * | 5/1999 | Gretz | .................. | G06F 11/3409 714/E11.192 |
| 6,400,715 B1 * | 6/2002 | Beaudoin | ................ | H04L 49/25 370/392 |
| 6,401,147 B1 * | 6/2002 | Sang | ....................... | H04L 47/24 710/14 |
| 6,473,815 B1 * | 10/2002 | Lu | ........................ | H04L 47/6215 370/402 |
| 6,704,316 B1 * | 3/2004 | He | ....................... | H04L 47/2433 370/395.1 |
| 7,062,556 B1 * | 6/2006 | Chen | ........................ | G06F 9/505 709/201 |

(Continued)

OTHER PUBLICATIONS

Khawatreh., "An Efficient Algorithm for Load Balancing in Multiprocessor Systems", International Journal of Advanced Computer Science and Applications, vol. 9, No. 3, pp. 160-164, 2018.

*Primary Examiner* — Adam Lee
(74) *Attorney, Agent, or Firm* — Kligler & Associates Patent Attorneys Ltd (57) ABSTRACT

An apparatus includes multiple processors, a classifier and queue management logic. The classifier is configured to classify tasks, which are received for execution by the processors, into multiple processor queues, each processor queue associated with a single processor or thread, and configured to temporarily store task entries that represent the tasks, and to send the tasks for execution by the associated processors. The queue management logic is configured to set, based on queue-lengths of the queues, an affinity strictness measure that quantifies a strictness with which the tasks of a same classified queue are to be processed by a same processor, and to assign the task entries to the queues while complying with the affinity strictness measure.

26 Claims, 5 Drawing Sheets

(56) References Cited

U.S. PATENT DOCUMENTS

| | | | | |
|---|---|---|---|---|
| 7,843,829 B1* | 11/2010 | Truong | H04L 47/10 370/235 |
| 7,865,624 B1 | 1/2011 | Hendel et al. | |
| 8,159,961 B1* | 4/2012 | Rai | H04L 67/1002 370/252 |
| 8,180,973 B1* | 5/2012 | Armangau | G06F 9/5033 711/147 |
| 8,208,406 B1* | 6/2012 | Jiang | H04L 47/623 370/255 |
| 9,411,636 B1* | 8/2016 | Ting | G06F 9/4843 |
| 2002/0029357 A1* | 3/2002 | Charnell | G06F 9/4491 714/5.11 |
| 2003/0018691 A1* | 1/2003 | Bono | G06F 9/5033 718/106 |
| 2003/0063565 A1* | 4/2003 | Kakani | H04L 47/30 370/235 |
| 2003/0065871 A1* | 4/2003 | Casper | G06F 13/28 710/316 |
| 2005/0089053 A1* | 4/2005 | Zhu | H04M 3/5232 370/412 |
| 2005/0223302 A1* | 10/2005 | Bono | G06F 11/0757 714/55 |
| 2005/0246461 A1* | 11/2005 | Accapadi | G06F 9/4812 710/200 |
| 2006/0045111 A1* | 3/2006 | Sinha | H04L 49/90 370/412 |
| 2006/0059473 A1 | 3/2006 | Moler | |
| 2007/0074214 A1* | 3/2007 | Ueno | G06F 9/542 718/100 |
| 2007/0124728 A1* | 5/2007 | Rosenbluth | G06F 9/526 718/100 |
| 2007/0212071 A1* | 9/2007 | Guo | H04L 47/564 398/69 |
| 2008/0155137 A1* | 6/2008 | Muppirala | G06F 9/4856 710/39 |
| 2008/0216076 A1* | 9/2008 | Udell | G01R 31/318314 718/100 |
| 2008/0228977 A1* | 9/2008 | Dignum | H04L 49/901 710/240 |
| 2008/0259961 A1* | 10/2008 | Wiemann | H04L 47/32 370/492 |
| 2008/0267203 A1* | 10/2008 | Curcio | H04L 49/90 370/412 |
| 2009/0031317 A1* | 1/2009 | Gopalan | G06F 9/5033 718/103 |
| 2009/0180607 A1* | 7/2009 | Kamlet | H04M 3/5233 379/265.12 |
| 2010/0277276 A1* | 11/2010 | Bayne | G07C 9/28 340/5.21 |
| 2010/0325268 A1* | 12/2010 | Muthiah | G06F 9/5083 709/224 |
| 2011/0142064 A1* | 6/2011 | Dubai | H04L 47/125 370/412 |
| 2011/0179240 A1* | 7/2011 | Sukonik | G06F 13/1642 711/158 |
| 2011/0182181 A1* | 7/2011 | Kang | H04L 43/0876 370/231 |
| 2011/0213738 A1* | 9/2011 | Sen | H04L 47/31 706/12 |
| 2011/0265095 A1* | 10/2011 | Cardona | G06F 9/505 718/105 |
| 2012/0023498 A1* | 1/2012 | Sundararaman | H04L 49/109 718/102 |
| 2012/0239912 A1* | 9/2012 | Maeda | G06F 12/02 712/226 |
| 2012/0250512 A1* | 10/2012 | Jagadeeswaran | H04L 47/12 370/235.1 |
| 2013/0024875 A1* | 1/2013 | Wang | G06F 13/22 719/318 |
| 2013/0104131 A1* | 4/2013 | Fujita | G06F 9/505 718/101 |
| 2013/0282707 A1* | 10/2013 | Stiffelman | G06F 16/334 707/723 |
| 2014/0105218 A1* | 4/2014 | Anand | H04L 49/9036 370/412 |
| 2014/0214977 A1* | 7/2014 | Buchko | H04L 12/1868 709/206 |
| 2014/0236987 A1* | 8/2014 | Liu | G06F 16/683 707/769 |
| 2015/0055456 A1* | 2/2015 | Agarwal | H04L 47/6295 370/230 |
| 2015/0288613 A1* | 10/2015 | Kwon | H04L 49/3027 370/232 |
| 2015/0339164 A1* | 11/2015 | Muthiah | H04L 67/1002 718/104 |
| 2016/0092259 A1* | 3/2016 | Mehta | G06F 9/5044 718/1 |
| 2016/0337257 A1* | 11/2016 | Yifrach | H04L 47/6205 |
| 2017/0048145 A1* | 2/2017 | Shiraki | H04L 41/0803 |
| 2018/0157515 A1* | 6/2018 | Malloy | H04L 47/627 |
| 2018/0241677 A1* | 8/2018 | Srebro | H04L 47/6255 |
| 2018/0285151 A1* | 10/2018 | Wang | G06F 9/5083 |
| 2018/0285294 A1* | 10/2018 | Chagam Reddy | G06F 13/18 |
| 2018/0337927 A1* | 11/2018 | Carnahan | G06N 20/00 |
| 2018/0349175 A1* | 12/2018 | Andrus | G06F 9/3851 |
| 2019/0129856 A1* | 5/2019 | Jean | G06F 12/0246 |
| 2019/0207856 A1* | 7/2019 | Guck | H04L 47/50 |
| 2019/0243682 A1* | 8/2019 | Botelho | G06F 9/45533 |
| 2019/0334821 A1* | 10/2019 | Holla | H04L 67/1008 |
| 2020/0028792 A1* | 1/2020 | Holla | G06F 9/45558 |
| 2020/0036646 A1* | 1/2020 | Mathew | H04L 12/4641 |

* cited by examiner

MULTI-PROCESSOR QUEUING MODEL

FIELD OF THE INVENTION

The present invention relates generally to multi-processor systems, and, particularly, to processor allocation and scheduling in a multi-processor system.

BACKGROUND OF THE INVENTION

Systems comprising a plurality of processors, and executing a plurality of tasks, typically rely on scheduling and allocation algorithms for balanced distribution of the tasks to processors.

For example, U.S. Patent Application Publication 2006/0059473 describes system and methods for executing a computer program in parallel in multiple execution environments; one of the described methods is use of computing programming language constructs to program parallel programming paradigms for a technical computing program that may execute in parallel in multiple execution environments.

Load balancing techniques are further described by Khawatreh, in "An Efficient Algorithm for Load Balancing in Multiprocessor Systems," International Journal of Advanced Computer Science and Applications, Vol. 9, No. 3, 2018 (paper 24).

SUMMARY OF THE INVENTION

An embodiment of the present invention that is described herein provides an apparatus including multiple processors, a classifier and queue management logic. The classifier is configured to classify tasks, which are received for execution by the processors, into multiple processor queues, each processor queue associated with a single processor or thread, and configured to temporarily store task entries that represent the tasks, and to send the tasks for execution by the associated processors. The queue management logic is configured to set, based on queue-lengths of the queues, an affinity strictness measure that quantifies a strictness with which the tasks of a same classified queue are to be processed by a same processor, and to assign the task entries to the queues while complying with the affinity strictness measure.

In some embodiments, the queue management logic is configured to perform a comparison between the queue-lengths and one or more thresholds, and to set the affinity strictness measure based on the comparison.

In an embodiment, the queue management logic is configured to specify a default queue for a given task; when a queue-length of the default queue is above a first threshold, permit assignment of a classified task to a queue other than the default queue; and when the queue-length of the default queue is below a second threshold, restrict assignment of the task only to the default queue.

In another embodiment, the queue management logic is configured to, when a queue-length of a given queue is above a first threshold, permit assignment to the given queue of one or more tasks that were assigned by default to a queue other than the given queue; and when the queue-length of the given queue is below a second threshold, forbid assignment to the given queue of any tasks that were assigned by default to any queue other than the given queue.

In yet another embodiment, the queue management logic is configured to modify one or more weights of a scheduling scheme among the tasks queued in a thread queue of a given thread of a multi-threaded processor, when a queue-length of the thread queue is above a first threshold.

In some embodiments, the queue management logic is configured to associate a set of tasks to a certain flow within a processor queue, and to assign the affinity strictness measure based on the flow association. In an example embodiment, the queue management logic is configured to specify a default queue and a secondary queue for a given flow, and to assign to the secondary queue one or more tasks of the given flow that are not assigned to the default queue due to the queue-lengths. In another embodiment, the queue management logic is configured to specify the secondary queue for a given flow, wherein the secondary queue is preferably associated with the same low-level cache as the default queue.

In some embodiments, the queue management logic is configured to specify a default queue and a secondary queue for a given flow; set for the given flow a threshold, such that when a queue-length of the default queue is above the threshold, tasks originally assigned to the default queue are permitted to be reassigned to the secondary queue or to another queue; assign to tasks of the given flow a flow-specific value; assign to each queue a spill-threshold; when the flow-specific value of the given flow is above the spill-threshold of the default queue, permit assignment of one or more tasks of the given flow to the secondary queue or to another queue; and when the flow-specific value of the given flow is below the spill-threshold of the default queue, restrict assignment of the tasks of the given flow only to the default queue. In a disclosed embodiment, the queue management logic is configured to adaptively modify the spill-threshold according to the queue length of the default queue. In another embodiment, upon detecting a FAT flow whose tasks are too computationally-intensive to be executed by a single one of the processors, the queue management logic is configured to assign lowest flow-specific values to the flows that are not part of the FAT flow. In an embodiment, upon detecting a FAT flow that is too computationally intensive to be executed by a single processor and requires multiple processors, the queue management logic is configured to spill the FAT flow to multiple processors. In some embodiments, the queue management logic is configured to discard a task based on queue length and the affinity strictness measure.

There is additionally provided, in accordance with an embodiment of the present invention, a method including classifying received tasks, for execution by processors, into multiple processor queues, each processor queue associated with a single processor or thread. The tasks are sent for execution by the associated processors. An affinity strictness measure, which quantifies a strictness with which the tasks of a same classified queue are to be processed by a same processor, is set based on queue-lengths of the queues. The task entries are assigned to the queues while complying with the affinity strictness measure.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and apparatus for assigning tasks to processors (the term "processor" and the term "thread" will be used interchangeably in the description hereinbelow). In some disclosed embodiments, a multi-processor computer system comprises a plurality of processors that execute a multitude of tasks, and a dispatching mechanism that dispatches tasks for execution by the processors. The dispatching of tasks to processors is done so as to improve the system performance according to preset criteria, which typically include low latency time for tasks, and low rate of discarded (i.e. dropped) tasks.

According to embodiments, tasks that the computer system receives are first classified by a classifier, which sends descriptors of the tasks to a main queue. A queue management unit (QMU), also referred to herein as queue management circuitry or queue management logic, extracts task descriptors from the main queue and sends the descriptors to a plurality of processor queues, which are coupled to physical processors. The physical processors extract new tasks, each from its corresponding processor queue.

According to embodiments of the present invention, tasks are classified to groups of tasks that have common characteristics by the classifier. The classifier is predefined for a certain system, and may perform classification according to various parameters or characteristics. The classification may change, from a first classification level to a second classification level. The first classification level classifies tasks into groups that have one or more common characteristics (will be referred to as Trunks hereinunder). For example, a first classification level may include classifying the tasks according to their priority. A second classification level may be based on Flows (the term "flow" in the context of the present invention refers to a group of sequential tasks, which share the same cached data, for example a group of tasks that have a common source and destination address, or a group of tasks that performs computations on a single set of parameters.

In embodiments in accordance with a first aspect of the present invention, the classifier may be implemented using a hash table to assign each task to a certain Trunk; the hash table comprises a default queue to which tasks of the trunk should be sent whenever possible. Thus, tasks that belong to the same trunk will preferably be processed by the same processor. Processing of tasks assigned to a certain trunk strictly by the same processor as the other tasks assigned to the trunk will be referred to hereinbelow as "strict affinity" processing, whereas processing that is not strictly confined to the same processor will be referred to hereinunder as "loose affinity" processing.

In embodiments of the present invention, strict affinity may be more efficient than loose affinity, e.g., because data that is common to some of the tasks of a trunk may be stored in a cache memory coupled to a certain processor, and not directly accessible to other processors that may execute other tasks of the same trunk. However, strict affinity may be undesirable when the load is high, and the processor cannot execute the trunk at the rate at which the classifier sends the tasks.

Embodiments of the present invention set, for each queue, an Affinity Strictness Measure, which quantifies the strictness with which the tasks of a trunk are to be assigned to the same processor. According to embodiments, the affinity strictness measure is determined based on at least the queue-length. In other embodiments (that pertain to a second aspect of the present invention), the affinity strictness measure may be determined based on flow-aware criteria, as will be explained below.

In some embodiments the QMU may increase the priority of task execution by the processor. For example, multi-thread processors may have a weighted-round-robin (WRR) priority scheme, and by enlarging the weight of a task, the task will execute faster, and strict affinity may be kept.

It should be noted that, according to embodiments of the present invention, loose affinity (i.e. the lowest level of the affinity strictness measure) does not imply that tasks are necessarily spilled to other queues—it implies only that, if the default queue is congested, the tasks may spill to other queues (assuming other queues are available).

According to an embodiment, the QMU receives from each processor queue an indication of the number of task entries that are currently queued, i.e., filled by the QMU but not yet extracted for execution by the processor (this number will be referred to hereinbelow as the "processor queue length" or "queue length"). In an embodiment, the allocation of tasks to processor-queues, and the management of processor queues, are done based at least on the processor queue lengths.

In some embodiments, the QMU allocates task entries to processor-queues and manages the processor queues according to a model which may include a plurality of thresholds, e.g. a 7-threshold model, which defines the management of the queue according to seven thresholds that are defined with reference to the queue length:

1. KA (Keep Affinity) Threshold
2. Z1 (Allow spill-in, low) threshold
3. Z2 (Allow spill-in, high) threshold
4. Q-Depth (queue-length based affinity) threshold
5. Discard (do not send tasks) threshold
6. WRR (Weighted Round-Robin) threshold
7. BA (Break Affinity) threshold According to embodiments of the present invention, the QMU sets its queue management policy according to the temporal queue length relative to the seven thresholds described hereinabove. In some embodiments, the QMU may also change the priority of the task in the processor, for example by changing the process' weight in the processors' weighted round-robin (WRR) circuit.

As additional packets of the same trunk arrive, the classifier may increase it granularity, and at some point, the classification is to flows (as defined hereinabove).

Embodiments according to a second aspect of the present invention add a flow-aware model, in which the queue management policy is determined based on the flow of the task. When using the flow-aware model, the QMU attempts to keep tasks of the same flow in the same processor-queue, and, if the tasks spill, have the tasks of the same flow spill to the same secondary processor-queue. In addition, if the tasks of a certain flow are too computationally-intensive to be executed by a single processor, even if the processor is dedicated to the flow (such flow will be referred to hereinafter as the "FAT Flow"), the QMU initially attempts to confine the flow to the same two queues, and, if it fails, allows spilling to other queues, as may be required In some embodiments of the present invention that support the flow-aware model, four hash tables are defined—a default-queue hash-table; a secondary-queue hash table, which is the preferred queue to which tasks that the default queue cannot accommodate will spill to; a flow specific threshold value (will be referred to as ladder-step threshold hereinbelow), which defines a step in a ladder of steps that help determine if a task will be executed in the default queue based on its flow; and, a FAT-flow-grouping hash table. In some embodiments, the secondary queue and the default-queue may share the same cache, or the same L1 of the cache; Consequently, tasks that spill to the secondary queue will have good cache performance.

In an embodiment, a Queue-Spill threshold is compared to the ladder-step value of a task; the task will enter the default queue if the ladder-step value is lower than the Queue-Spill threshold, and spill to the Secondary Queue (as defined in the Secondary-Queue hash) if the ladder-step is higher than the Queue-Spill threshold. In some embodiments, if the ladder-step is equal to the Queue-Spill threshold, the task will be accepted to the default queue or spill to the secondary queue based on the queue-length.

In some embodiments of the present invention, the QMU automatically decreases the Queue-Spill threshold if the queue length is lower than a first threshold, and automatically increases the Queue-Spill threshold if the queue length is higher than a second threshold; thus, the case wherein the queue-length becomes too low or too high is avoided. Thus, according to embodiments of the present invention, queue length may be controlled to be adaptive, according to changing traffic nature.

According to some embodiments, a FAT flow is always searched for by comparing the activities of all flows and finding the most active flow. In an embodiment, all tasks of the queue that are part of the FAT flow, get a ladder-step equal to the minimum possible number; consequently, other tasks which are not part of the FAT flow will be prioritized to spill out of the default queue, possibly to a plurality of processors.

Figure 1:
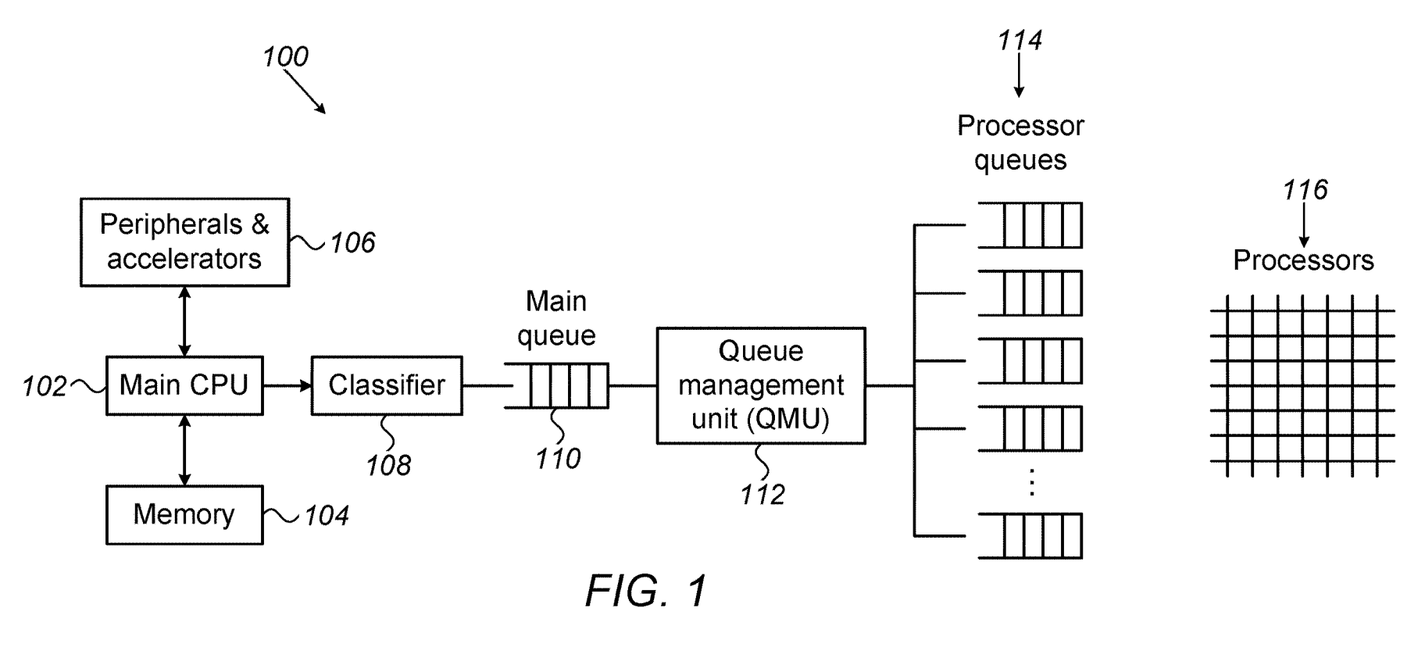
FIG. 1 is a block diagram that schematically illustrates a computer system, according to embodiments of the present invention.

Thus, according to embodiments of the present invention, task processing with low latency and low drop rate is achieved by suitable load balancing of the processors. Affinity and process priority are traded off when queue lengths grow, and processing of tasks of the same flow is done, when possible, in the same processor or the same two processors. "FAT" flows, which require more than one processor, will likely execute on the same two processors, because tasks that belong to other flows will be sent to other queues; but, if the FAT flows require more resources, spill out to as many queues as needed System Description FIG. 1 is a block diagram that schematically illustrates a computer system 100 according to embodiments of the present invention. The computer system comprises a main CPU 102, a memory 104, peripherals and accelerators 106, a Classifier 108, a Main Queue 110, a Queue Management Unit (QMU) 112, processor queues 114, and a mesh of processors 116. Main CPU 102 receives tasks from peripherals & accelerators 106 and/or from memory 104 and forwards the tasks to classifier 108.

In an example embodiment, the tasks may be network packets that the computer system processes and forwards to various destinations. For example, system 100 may be implemented as part of a network switch or network adapter that processes packets.

According to embodiments of the present invention, the term Trunk of Tasks refers to a group of sequential tasks that share common characteristics; for example, a trunk of tasks may be the aggregations of all packet processing tasks that that share the same input port. Classifier 108 classifies the tasks that the classifier receives to separate trunks (the classifier may increase the granularity of the classification to Flows, as will be described hereinbelow). For each trunk a default processor is allocated. The classifier generates descriptors of the tasks (comprising an indicator to the target processor, and other information), and sends the descriptors to main queue 110, which, in the example embodiment of FIG. 1, comprises a First-In-First-Out (FIFO) memory.

According to the example embodiment of FIG. 1, an array of processors 116, configured as a mesh network, executes tasks that the array extracts from processor queues 114. A separate processor of processors-array 116 is allocates to each processor-queue.

QMU 112 extracts task descriptors from main queue 110 and stores the descriptors in one of processor queues 114. The selection of a processor queue determines the processor that will execute the corresponding task. The algorithms to select the processor queue for tasks corresponding to the task descriptor that the QMU reads from main queue 110 may result in good load balancing and better performance (high throughput and low latency) of the computer systems, as will be described hereinbelow, with reference to further figures of the present specifications.

The configuration of computer 100 is an example configuration that is depicted purely for the sake of conceptual clarity. Other suitable configurations may be used in alternative embodiments of the present invention. For example, Classifier 108 may be implemented by software or firmware; main CPU 102 may be replaced by a plurality of processors; main queue 110 and processor queues 114 may comprise First-In-First-Out (FIFO) memories or random-access memories (RAMs).

In some embodiments, main CPU 102 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Figure 2:
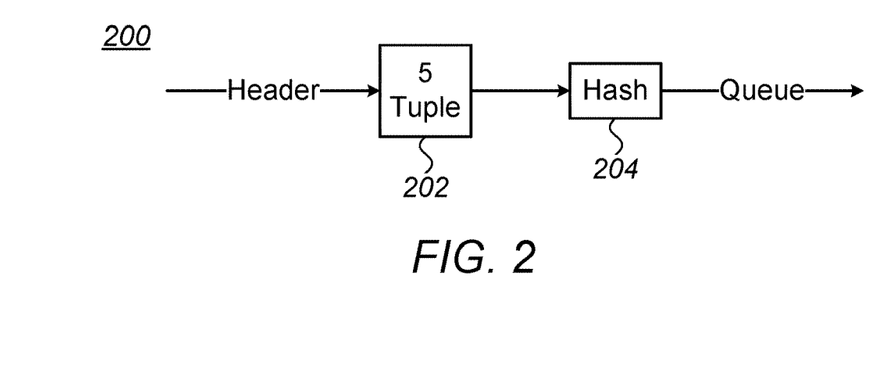
FIG. 2 is a block diagram that schematically illustrates a circuit for determining the default processor for a task, in accordance with an embodiment of the present invention.

FIG. 2 is a block diagram that schematically describes a circuit 200 for determining the default processor for a task in accordance with an embodiment of the present invention. Circuit 200 is typically embedded in QMU 112 (FIG. 1). In the example embodiment of FIG. 2, a task comprises the processing and the forwarding of a network packet. The packet header comprises a 5-tuple 202, which may comprise, for example, the packet origin IP address, the packer origin port, the packet destination IP address, the packer destination port, and the protocol to be used. The 5-tuple is input to a hash table 204, which determines at least the default queue to which the QMU will send the task's descriptor.

The configuration shown in FIG. 2 is an example configuration that is depicted purely for the sake of conceptual clarity. For example, in alternative embodiments the Hash table may be replaced by a dynamic allocation circuit.

Figure 3:
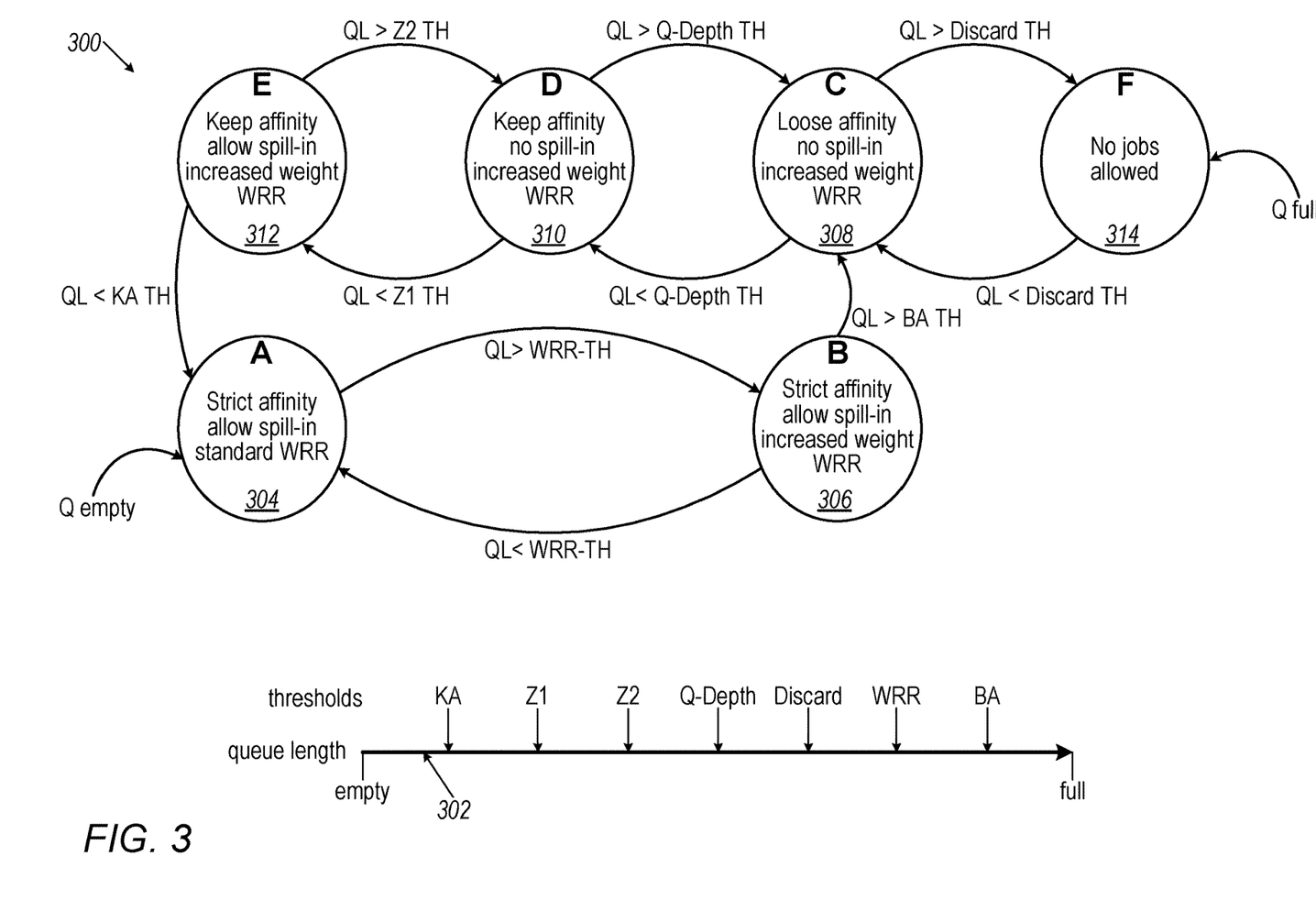
FIG. 3 is a state-diagram that schematically illustrates a 7-threshold queue management model, according to an embodiment of the present invention.

FIG. 3 is a state-diagram that schematically describes a 7-threshold queue management model 300, according to an embodiment of the present invention. A separate state diagram is allocated to each of processor queues 114 (FIG. 1). Seven thresholds are defined along the queue-length axis 302. The left end of the axis represents an empty queue, and the right end represents a queue that is completely full.

The seven thresholds are:
KA (Keep Affinity) Threshold;
Z1 (Allow spill-in, low) threshold;
Z2 (Allow spill-in, high) threshold;
Q-Depth (queue-length based affinity) threshold;
Discard (do not send tasks) threshold;
WRR (Weighted Round-Robin) threshold; and,
BA (Break Affinity) threshold.

In an embodiment, the length of the queue is compared to the thresholds described hereinabove; however, the policy of the QMU pertaining to the corresponding processor queue is a function not only of the current queue length, but also of the history, and, of the status of the other queues of the computer system.

The QMU may be in one of six states. In each of the states, the current processor-queue policy is characterized in three aspects:
Affinity Strictness Measure—strict affinity may be observed in some states, loose affinity in other states, and affinity which is a function of the queue length in yet other states;
Spill-in from other queues may be allowed in some states, and disallowed in others;
Task priority—in some states the processor priority (e.g. the weight of the task in a WRR priority scheme) may be increased, whereas in other states the weight remains unchanged (i.e.—default weight is used);

According to the example embodiment of FIG. 3, the six states that the QMU may be in (with respect to each of the processor queues) are—a state A (304), a state B (306), a state C (308), a state D (310), a state E (312), and a state F (314). The processor-queue policy of the QMU in each of the six states is summarized in the table below:

| State | affinity strictness measure | allow spill in from other flows | processor WRR priority |
| --- | --- | --- | --- |
| A | keep affinity | yes | default |
| B | keep affinity | yes | increased |
| C | break affinity | no | increased |
| D | according to queue length | no | increased |
| E | keep affinity | yes | increased |
| F | do not accept any task | | increased |

According to the example embodiment of FIG. 3, the states will change according to the rules depicted hereinbelow:
When the queue is empty, the state is set to A;
If the state is A, and queue length is more than WRR-threshold, the state changes to B;
If the state is B, and queue length is less than WRR-threshold, the state changes to A;
If the state is B, and queue length is more than BA threshold, the state changes to C;
If the state is C, and queue length is less than Q-Depth threshold, the state changes to D;
If the state is D, and queue length is more than Q-Depth threshold, the state changes to C;
If the state is D, and queue length is less than Z1 threshold, the state changes to E;
If the state is E, and queue length is more than Z2 threshold, the state changes to D;
If the state is E, and queue length is less than KA threshold, the state changes to A;
If the state is C, and queue length is more than Discard threshold, the state changes to F;
If the state is F, and queue length is less than Discard threshold, the state changes to C;
If the queue is full, the state is set to F.

In general, longer queue lengths imply longer latency, which should be avoided when possible. According to embodiments of the present invention, the values of the seven thresholds determine the performance of the computer system (performance, in the context of the present invention, is a combined measure of low-latency and small number of dropped packets):

BA Threshold: If the setting of the BA threshold is low, tasks of the current trunk may spill to other queues, and hence processed with low affinity and reduced performance; however, if BA threshold is set too high, a burst of tasks that require more performance than the processor can provide may quickly result in reaching the Discard threshold, or even the point where the queue is full, which may lead to dropped tasks and increased latency.

WRR Threshold—if the setting of the WRR threshold is high, the risk that the queue will overflow as a result a burst of tasks that require more performance than the processor can provide increases; however, if the setting is too low, other tasks that the processor executes will get lower priority, and performance of the other tasks may degrade.

Discard Threshold—when the discard threshold is reached tasks are dropped. This is similar to the case that the queue is completely full, but allows more flexibility—e.g. working with equal queue sizes.

Q-Depth threshold—if queue length is above Q-Depth threshold, affinity is not preserved, and tasks will spill to other queues, reducing the load and latency on the present queue. If queue length is below the Q-Depth threshold, affinity will be observed, and more tasks will be directed to the present queue. Thus, queue-length tends to converge to the value of Q-Depth (queue length will not converge to Q-Depth if, although loose affinity is taken, the queue will not empty due to processor congestion; or if, although strict affinity is taken, no more tasks arrive at the queue). Setting the Q-Depth threshold high, in addition to increasing the latency, will result in queues which converge to a high value, and, in case of a heavy-load burst, may fill up the queue. Setting the Q-Depth threshold to a value that is too low may result in sending too many tasks to other queues with loose affinity, and hence lower performance.

If Z2 threshold setting is high, the queue will accept a larger number of spilled-in tasks, which may make it difficult to reduce the load at higher values of queue-length; if Z2 threshold is low, the queue will accept a smaller number of spilled-in tasks, which may load other queues.

Z1 setting is high must be lower the Z2, to allow some amount of hysteresis.

Thus, the value of the different thresholds must be tuned to allow optimal performance.

The seven-threshold state diagram of FIG. 3, described hereinabove, efficiently distributes tasks to processors by adjusting the affinity strictness measure, achieving low average latency of tasks, and a low rate of dropped tasks.

The structure of state-diagram 300 is an example structure that is depicted purely for the sake of conceptual clarity. Other suitable state-diagrams may be used. The order of the thresholds along the queue-length axis may be different from the order depicted in 302.

The state diagram may vary, for example, by adding hysteresis, or by adding intermediate states that smooth the change of queue-selection policies.

The state diagram may be implemented in a variety of techniques; for example, using a synchronous or an asynchronous state-machine, or using a programmable microcontroller.

Flow Aware Mode

As previously described, at some point in time the granularity of the classifier may increase from Trunks to Flows. At this time, embodiments according to the first embodiment may be dynamically replaced by embodiments according to a second aspect of the present invention, to further improve the performance of the system. In embodiment according to the first aspect, in the case wherein the queue is in loose affinity and tasks may spill out of the default queue, the apparatuses and methods described hereinabove determine if a task is accepted to a queue, and to which queue it will spill, regardless of its flow.

For example, for a queue with maximum data rate R, if a queue comprises three flows—X1, X2, and X3; and X1+X2+X3>R, the 7-threshold model may spill parts of X1, X2 and X3 to other queues; however, if X1+X2<R, a better policy would be to keep R1 and R2 at the default queue, and spill only parts of X3.

Another example is support of a flow which requires more resources than the capability of a single processor—even if the priority of tasks associated with the flow is raised to maximum (we will refer to hereinbelow to flows which cannot be executed by a single processor as "FAT flows"). The FAT flow will, by definition, spill to other queues; but for better performance all tasks that belong to other flows should be removed from the queue before any task of the FAT flow spills-out (typically, there is no more than one FAT flow active at the same time, but it is noted that additional FAT flows may be handled in a similar manner, e.g. adding more thresholds to distinguish between different FAT flows and spilling the tasks accordingly).

According to some embodiments of the present invention, The QMU may be configured to provide flow awareness.

Figure 4:
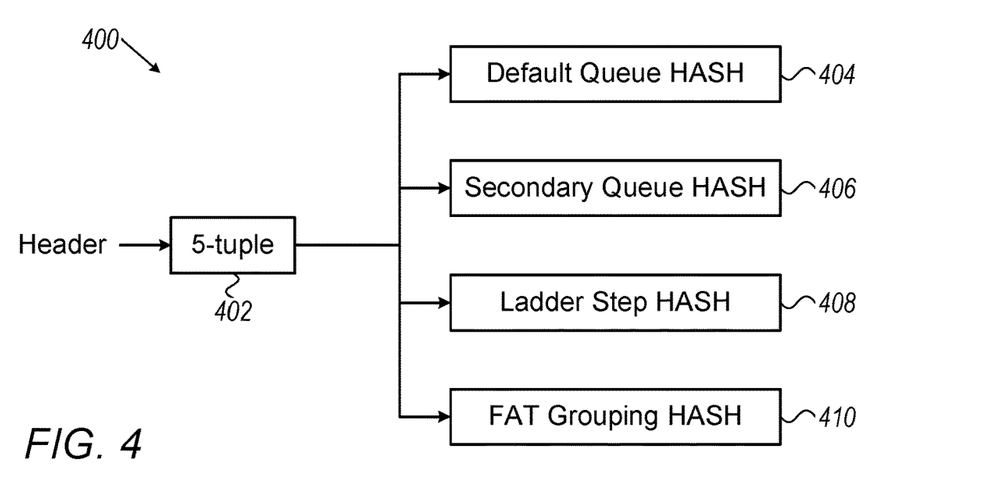
FIG. 4 is a block diagram that schematically illustrates a four-hash-table structure supporting flow awareness, according to an embodiment of the present invention.

FIG. 4 is a block diagram that schematically describes a four-hash-table structure 400 supporting flow awareness, according to an embodiment of the present invention. The QMU extract packet characteristics from the packet header and/or packet data, e.g. a 5-tuple 402 may be extracted from the packet header; the QMU then uses the 5-tuple as an index into four hash tables: Default Queue Hash 404, which defines the default queue for the task; a Secondary Queue Hash 406, which defines a queue for the tasks if the task cannot be processed by the processor that is coupled to the default queue; A Ladder-Step Hash 408, and a Fat-Grouping Hash 410.

In some embodiments, the secondary queue and the default queue share the same cache or the same L1 of the cache; as a result, tasks that spill to the secondary queue will still have good cache hit ratios.

By assigning the same default queue to tasks of the same flow, good affinity is provided wherein tasks do not spill to secondary queues. By assigning the same secondary queue to tasks of the same flow, tasks of the same flow will execute in two queues that preferably share at least part of a cache memory, with affinity that may be better than the case that tasks of the flow are spilled to multiple queues.

The configuration described with respect to FIG. 4 is an example configuration that is depicted purely for the sake of conceptual clarity. Other suitable configurations may be used; for example, the four hash tables may be aggregated to one table.

Figure 5:
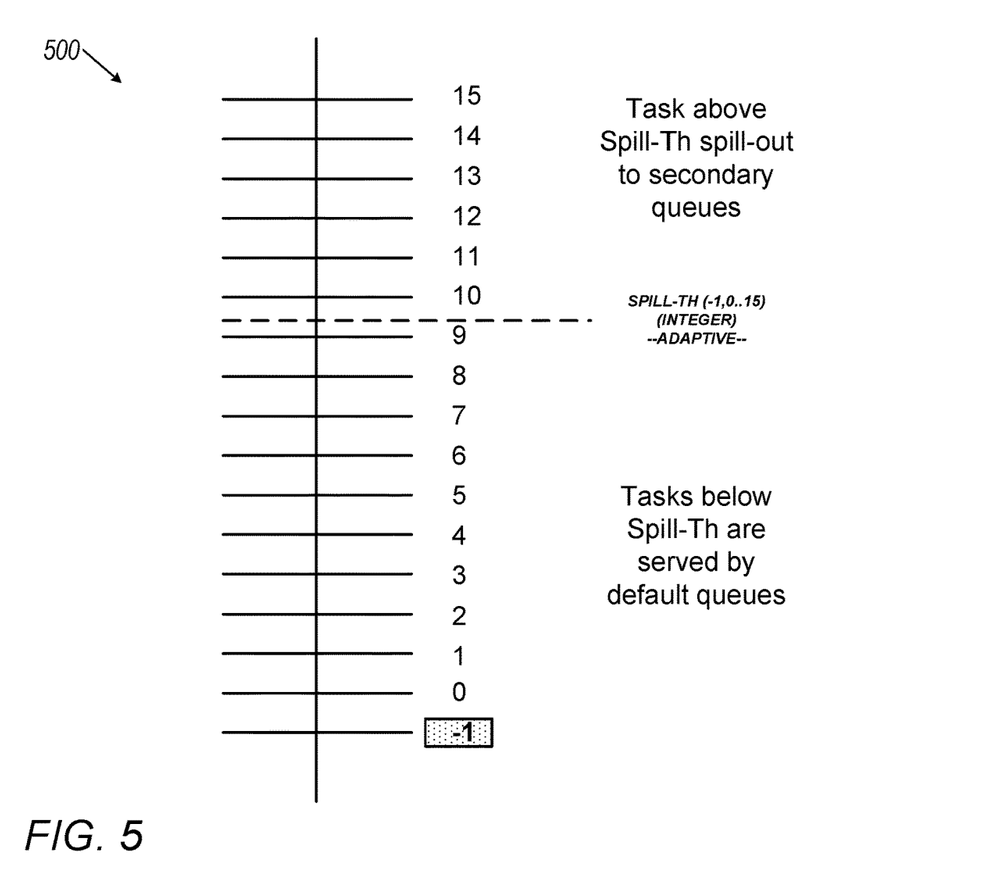
FIG. 5 is a diagram that schematically illustrates a Ladder-step threshold scheme in accordance to embodiments of the present invention.

FIG. 5 is a diagram that schematically describes a Ladder 500 in accordance with embodiments of the present invention. Ladder-Step Hash 408 (FIG. 4) defines a flow-specific threshold for each flow (referred to as Ladder-Step hereinbelow). In the example embodiment of FIG. 5 the ladder comprises integer numbers from minus −1 to 15, and the ladder-step for a certain flow is set to 9. In alternative embodiments, the ladder may comprise a different number of steps, and each flow may be assigned any ladder-step. In embodiments of the present invention, the ladder-step is compared with a spill threshold that is set for each queue, to determine if tasks should be executed in the default queue or spilled to other queues. In some embodiment, the spill threshold may change, based on the queue length.

Figure 6:
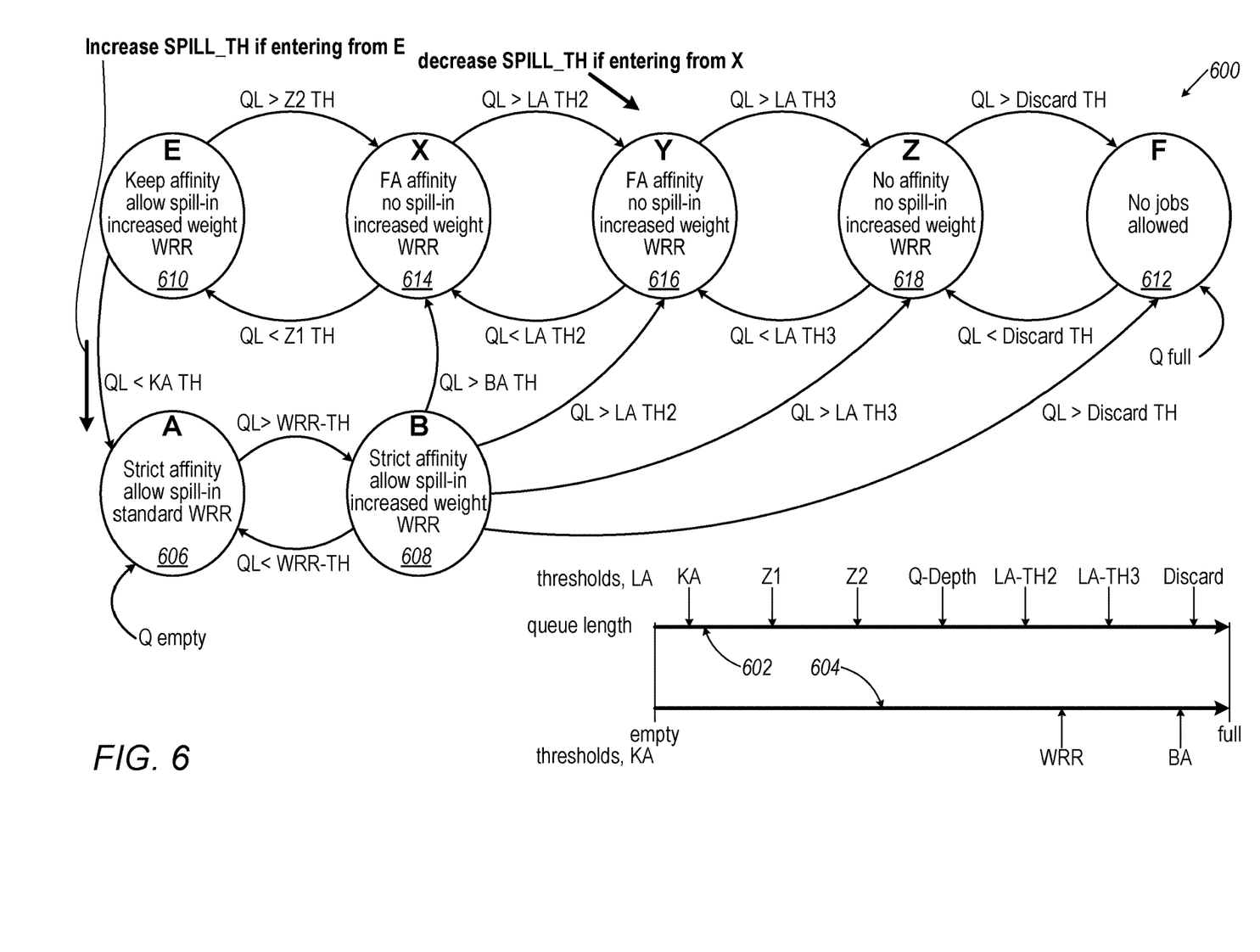
FIG. 6 is a state-diagram that schematically illustrates a flow-aware queue management model, according to an embodiment of the present invention.

FIG. 6 is a state-diagram that schematically describes a flow-aware queue management model 600, according to an embodiment of the present invention. In the states where strict affinity is kept, the model of FIG. 6 is identical to the model of FIG. 3. When affinity is not kept, the model of FIG. 6 adds flow awareness.

FIG. 6 describes two sets of thresholds that control the transitions between states—a Set of Thresholds 602, which defines the thresholds that are in effect when the QMU is in Loose Affinity, and a Set of Thresholds 604, which defines the thresholds that are in effect when the QMU is in Strict Affinity. In addition to the queue-length thresholds shown in 602 and 604, a new threshold is defined—Spill-Threshold, which the QMU compares to the ladder-step defined for each flow (a common ladder-step is defined for each task in the flow). According to the example embodiment of FIG. 5 the Spill-Threshold may assume any integer number from −1 to 15.

In the example embodiment of FIG. 6, The QMU may be in one of seven states. Four of the states are similar to corresponding states of the non-flow-aware model (FIG. 3): a State A (606), a State B (608), a state E (610) and a State F (612), which are similar, respectively, to States A, B, E and F of FIGS. 3 (304, 306, 312 and 314). In addition, three more states are defined in the example embodiment of FIG. 6: a State X (614), a State Y (616), and a State Z (618).

When the QMU is in state X 614 or State Y 616, the QMU will: a) if the ladder-step for a task/flow is higher than the Spill-Threshold—spill the task to another queue (the secondary queue or, if the secondary queue cannot accept the task—to some other queue); b) if the ladder-step for a task is lower than the Spill-Threshold—keep the task in the queue; c) if the ladder-step for a task is equal to the Spill-Threshold—keep the task in the queue if queue-length is smaller than Q-Depth threshold, and spill the task otherwise. The operation of the QMU when in States X or Y, described hereinabove, will be referred to hereinbelow as Flow-Aware Affinity.

The QMU's processor-queue policy in the seven states of the flow-aware model is summarized in the table below:

| State | affinity strictness measure | allow spill in from other flows | processor WRR priority |
|---|---|---|---|
| A | Keep Affinity | yes | default |
| B | Keep Affinity | yes | increased |
| E | Flow-Aware | yes | increased |
| X | Flow-Aware | no | increased |
| Y | Flow-Aware | no | increased |
| Z | Break Affinity | no | increased |
| F | do not accept any task | | increased |

According to the example embodiment of FIG. 6, the states will change according to the rules depicted hereinbelow:

When the queue is empty, the state is set to A;

If the state is A, and queue length is more than WRR-threshold, the state changes to B;

If the state is B, and queue length is less than WRR-threshold, the state changes to A;

If the state is B, and queue length is more than BA threshold, the state changes to X (or alternatively, the state may change from B to Y or to Z or to F, based on the thresholds configuration);

If the state is X, and queue length is less than Z1 threshold, the state changes to E;

If the state is X, and queue length is more than LA TH2, the state changes to Y;

If the state is Y, and queue length is more than LA TH3, the state changes to Z;

If the state is Y, and queue length is less than LA TH2, the state changes to X;

If the state is Z, and queue length is more than Discard threshold, the state changes to F;

If the state is Z, and queue length is less than LA TH3, the state changes to Y;

If the state is F, and queue length is less than Discard threshold, the state changes to Z;

If the state is E, and queue length is more than Z2 threshold, the state changes to X;

If the state is E, and queue length is less than KA threshold, the state is set to A.

According to embodiment of the present invention, the Spill-TH is adaptively increased whenever the queue length decreases to a value lower than KA Threshold, in this example, when the QMU transitions from State E 610 to state A 606, allowing more tasks to be executed in the current queue; and decreased whenever the QMU transitions from State X 614 to State Y 616, decreasing the number of tasks executed from the current queue (and, thus, decreasing the congestion). The value of Spill-TH may be increased or decreased in various increments (which may be configurable).

According to embodiments of the present invention, when a FAT flow (as defined hereinabove) is accepted into its default queue, the QMU will assign to the other tasks of that queue a ladder-step value of minus 1. Thus, when in flow-aware affinity, the QMU will give priority to the tasks of the FAT flow, and other tasks will be the first ones sent to be executed outside the current queue. The FAT flow will execute in the default queue, and the secondary queue if required, and, if the FAT flow is still too big, spill to other queues, as many as required.

The Flow-Aware state diagram of FIG. 6, described hereinabove, distributes tasks to processors so that tasks of the same flow are likely to be executed by the same processor. In case of a spill, tasks belonging to a common flow are likely to be spilled together to another processor, or, in case of a FAT flow, by the same two (or more) processors. Thus, low average latency of tasks, and a low rate of dropped tasks may be achieved.

The structure of state-diagram 600 is an example structure that is depicted purely for the sake of conceptual clarity. Other suitable state-diagrams may be used. For example, the order of the thresholds along the queue-length axis may be different from the order depicted in 602 and 604.

The state diagram may vary, for example, by adding hysteresis, or by adding intermediate states that smooth the change of queue-selection policies.

The state diagram may be implemented in a variety of techniques; for example, using a synchronous or an asynchronous state-machine, or using a programmable microcontroller.

Figure 7:
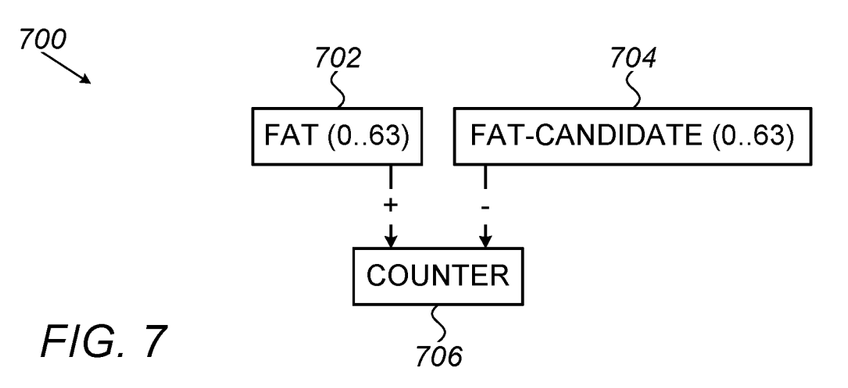
FIG. 7 is a block diagram that schematically illustrates a circuit to determine which flow is a FAT flow, in accordance with embodiments of the present invention.

FIG. 7 is a conceptual block diagram of a circuit 700 to determine which flow is a FAT flow, in accordance with embodiments of the present invention. According to the example embodiment of FIG. 7, The search for the FAT flow is done in a group of 64 flows (other sizes may be used in alternative embodiments). Circuit 700 compares the activity of a FAT flow 702 to the activity of a Candidate-FAT Flow 704. The comparison is done by a counter 706, which increments whenever FAT Flow 702 submits a task (to any processor queue), and decrements whenever Candidate-FAT Flow 704 submits a task. Counter 706 counts until it reaches a preset positive threshold, or a preset negative threshold, wherein the counter will be reset, and a new comparison will start. If the limit that has been reached is negative, the Candidate-FAT flow 706 is considered "FATTER" (that is—more likely to be the FAT flow) than FAT-Flow 702; the Candidate-FAT flow will be designated as the FAT Flow, and, in the next comparison, FAT Flow 702 will be updated accordingly.

The configuration of circuit 700 is an example configuration that is depicted purely for the sake of conceptual clarity. Other suitable configurations may be used in alternative embodiments. For example, a binary search algorithm may be used. In some embodiments, counter 706 may be protected from overflow by multiplying its value by a constant smaller than 1 when the count exceeds a predefined limit.

In various embodiments, the different elements of computer 100 and/or QMU 112 may be implemented using suitable hardware, such as in an Application-Specific Integrated Circuit (ASIC) or Field-Programmable Gate Array (FPGA). Alternatively, some elements of apparatus QMU 112 may be implemented in software, or using a combination of software and hardware elements.

The embodiments described herein refer mainly to "strict affinity" and "loose affinity," as well as various thresholds, as examples of affinity strictness measures. In alternative embodiments, however, QMU 112 may use any other suitable kinds of affinity strictness measures for assigning tasks to queues.

Although the embodiments described herein mainly address multi-processing queuing, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   multiple processors;
   a classifier, configured to classify tasks, which are received for execution by the processors, into groups of tasks that have common characteristics;
   multiple processor queues, each processor queue associated with a single processor, and configured to temporarily store task entries that represent the tasks, and to send the tasks for execution by the associated processors, wherein each group of tasks is associated with a respective default queue;
   queue management logic, which is configured to:
      set for each of the queues, based on respective queues-lengths of the queues, an affinity state that defines a strictness with which the tasks of a same group for which the queue serves as the default queue are to be processed by a same processor;
      assign the tasks to the queues while complying with the affinity states of the queues;
      send the tasks from the queues for execution by the associated processors, wherein the associated processors are allocated to the queues and execute the tasks;
      when a queue-length of a default queue of a given group is greater than a loose affinity threshold, decrease a spill threshold for the default queue, set a flow aware affinity state to the default queue, prevent spill-in tasks from other queues, and set an increased weight scheme for tasks of the default queue; or
      when a queue-length of a default queue of a given group is less than a keep affinity threshold, increase a spill threshold for the default queue, set a strict affinity state for the default queue, allow spill-in tasks from other queues, and set a standard scheme for tasks of the default queue; and
      adjust the loose affinity threshold and/or the keep affinity threshold to achieve optimal performance of the apparatus, wherein the adjusting results in an average latency of the tasks being below a first limit and a rate of dropped tasks being below a second limit.

2. The apparatus according to claim 1, wherein the queue management logic is further configured to when a queue-length of a default queue of a given group is empty, set a strict affinity state to the default queue, allow spill-in tasks from other queues, and set a standard scheme for tasks of the default queue.

3. The apparatus according to claim 1, wherein the queue management logic is further configured to:
   when a queue-length of a default queue of a given group is above a weighted round robin threshold, set a strict affinity state to the default queue, allow spill-in tasks from other queues, and set an increased weight weighted round robin priority scheme for tasks of the default queue.

4. The apparatus according to claim 1, wherein the queue management logic is further configured to when a queue-length of a default queue of a given group is above a break affinity threshold, set a flow aware affinity state to the default queue, prevent spill-in tasks from other queues, and set an increased weight weighted round robin priority scheme for tasks of the default queue.

5. The apparatus according to claim 1, wherein the queue management logic is further configured to when a queue-length of a default queue of a given group is less than an allow spill-in low threshold, set a keep affinity state to the default queue, allow spill-in tasks from other queues, and set an increased weight weighted round robin priority scheme for tasks of the default queue.

6. The apparatus according to claim 1, wherein the groups comprise flows.

7. The apparatus according to claim 6, wherein the queue management logic is configured to specify a default queue and a secondary queue for a given flow, and to assign to the secondary queue one or more tasks of the given flow that are not assigned to the default queue due to the queue-lengths.

8. The apparatus according to claim 7, wherein the secondary queue is preferably associated with the same low-level cache as the default queue.

9. The apparatus according to claim 1, wherein the queue management logic is configured to:
   specify a default queue and a secondary queue for a given flow; and
   set for the given flow a threshold, such that when a queue-length of the default queue is above the threshold, a determination of whether tasks originally assigned to the default queue are permitted to be reassigned to the secondary queue or to another queue is performed on a per flow basis.

10. The apparatus according to claim 1, wherein the queue management logic is configured to identify FAT flows whose tasks are too computationally-intensive to be executed by a single one of the processors, and to prevent flows that are not part of a FAT flow from being assigned to default queues of the FAT flows.

11. The apparatus according to claim 10, wherein, upon detecting a FAT flow that is too computationally intensive to be executed by a single processor and requires multiple processors, the queue management logic is configured to spill the FAT flow to multiple processors.

12. The apparatus according to claim 1, wherein the queue management logic is configured to discard a task based on queue length and the affinity state.

13. The apparatus according to claim 1, wherein the dispatching mechanism assigns the tasks to the queues based at least on the queue lengths, while complying with the affinity states of the queues.

14. A method, comprising:
   classifying received tasks, for execution by processors, into groups of tasks that have common characteristics;
   managing multiple processor queues, each processor queue associated with a single processor, wherein each group is associated with a respective default queue;
   setting for each of the queues, based on respective queue-lengths of the queues, an affinity state that defines a strictness with which the tasks of a same group for which the queue serves as the default queue are to be processed by a same processor;
   assigning the tasks to the queues while complying with the affinity states of the queues;
   sending the tasks from the queues for execution by the associated processors, wherein the associated processors are allocated to the queues and execute the tasks;
   when a queue-length of a default queue of a given group is greater than a loose affinity threshold, decreasing a spill threshold for the default queue, setting a flow aware affinity state to the default queue, preventing spill-in tasks from other queues, and setting an increased weight scheme for tasks of the default queue; or when a queue-length of a default queue of a given group is less than a keep affinity threshold, increasing a spill threshold for the default queue, setting a strict affinity state for the default queue, allowing spill-in tasks from other queues, and setting a standard scheme for tasks of the default queue; and adjusting the loose affinity threshold and/or the keep affinity threshold to achieve optimal performance of the processors and processor queues, wherein the adjusting results in an average latency of the tasks being below a first limit and a rate of dropped tasks being below a second limit.

15. The method according to claim 14, further comprising:

when a queue-length of a default queue of a given group is empty, setting a strict affinity state to the default queue, allowing spill-in tasks from other queues, and setting a standard scheme for tasks of the default queue.

16. The method according to claim 14, further comprising:

when a queue-length of a default queue of a given group is above a weighted round robin threshold, setting a strict affinity state to the default queue, allowing spill-in tasks from other queues, and setting an increased weight weighted round robin priority scheme for tasks of the default queue.

17. The method according to claim 14, further comprising:

when a queue-length of a default queue of a given group is above a break affinity threshold, setting a flow aware affinity state to the default queue, preventing spill-in tasks from other queues, and setting an increased weight weighted round robin priority scheme for tasks of the default queue.

18. The method according to claim 14, further comprising:

when a queue-length of a default queue of a given group is less than an allow spill-in low threshold, setting a keep affinity state to the default queue, allowing spill-in tasks from other queues, and setting an increased weight weighted round robin priority scheme for tasks of the default queue.

19. The method according to claim 14, wherein setting the affinity state comprises associating a set of tasks to a certain flow within a processor queue, and assigning the affinity state based on the flow association.

20. The method according to claim 19, wherein assigning the tasks to the queues comprises specifying a default queue and a secondary queue for a given flow, and, assigning to the secondary queue one or more tasks of the given flow that are not assigned to the default queue due to the queue-lengths.

21. The method according to claim 20, wherein the secondary queue is preferably associated with the same low-level cache as the default queue.

22. The method according to claim 14, wherein assigning the tasks to the queues comprises:

specifying a default queue and a secondary queue for a given flow;

setting for the given flow a threshold; and when a queue-length of the default queue is above the threshold, determining whether to permit tasks originally assigned to the default queue to be reassigned to the secondary queue or to another queue, on a per flow basis.

23. The method according to claim 14, wherein assigning the tasks to the queues comprises, upon detecting a FAT flow whose tasks are too computationally-intensive to be executed by a single one of the processors, preventing flows that are not part of the FAT flow from being assigned to a default queue of the FAT flow.

24. The method according to claim 23, further comprising:

upon detecting a FAT flow that is too computationally intensive to be executed by a single processor and requires multiple processors, spilling the FAT flow to multiple processors.

25. The method according to claim 14, further comprising:

discarding a task based on queue length and the affinity state.

26. The method according to claim 14, wherein assigning the tasks to the queues comprises assigning based at least on the queue lengths, while complying with the affinity states of the queues.

* * * * *